(12) United States Patent  
Chowdhury et al.

(10) Patent No.: US 8,645,408 B2  
(45) Date of Patent: Feb. 4, 2014

(54) DISCOVERY OF APPLICATION SERVER IN AN IP NETWORK

(75) Inventors: Kuntal Chowdhury, Plano, TX (US); Marvin Bienn, Dallas, TX (US)

(73) Assignee: Apple Inc., Cupertino, CA (US)

(*) Notice: Subject to any disclaimer, the term of this patent is extended or adjusted under 35 U.S.C. 154(b) by 1775 days.

(21) Appl. No.: 10/780,007

(22) Filed: Feb. 17, 2004

(65) Prior Publication Data

US 2004/0186850 A1  Sep. 23, 2004

Related U.S. Application Data

(60) Provisional application No. 60/448,188, filed on Feb. 18, 2003.

(51) Int. Cl.
  *G06F 7/00* (2006.01)
  *G06F 17/00* (2006.01)

(52) U.S. Cl.
  USPC ............ 707/769; 707/999.001; 707/709

(58) Field of Classification Search
  USPC .................................................. 709/224
  See application file for complete search history.

(56) References Cited

U.S. PATENT DOCUMENTS 6,970,924 B1* 11/2005 Chu et al. ............... 709/224
7,225,272 B2* 5/2007 Kelley et al. ........... 709/245
7,349,894 B2* 3/2008 Barth et al. ............... 707/3

FOREIGN PATENT DOCUMENTS

EP  1009152 A2  6/2000

OTHER PUBLICATIONS

Non-Patent Literature, "Gateway (telecommunications)," published on Wikipedia.*
Non-Patent Literature, "Uniform Resource Identifier," published on Wikipedia.*
Non-Patent Literature, Caron, Jacques, "DNS-based roaming," Internet Draft, Apr. 2002, 5 pages.*
Caron, Jacques, DNS-based roaming, internet draft, Apr. 2002, 5 pages.

* cited by examiner

*Primary Examiner* — Paul Kim
(74) *Attorney, Agent, or Firm* — Meyertons, Hood, Kivlin, Kowert & Goetzel, P.C.

(57) ABSTRACT

The present invention provides for the discovery of an Internet Protocol (IP) address of an application server associated with an IP network. An IP device is granted access to an IP network. Access to the IP network assumes an IP address assignment for the IP device. The network domain name is discovery by performing a Reverse DNS query on the assigned IP address or an IP address associated with the IP network device granting access to the IP device. Using a application server domain name (derived from the network domain name) a DNS query is perform to determine all IP addresses associated with the application server domain name.

12 Claims, 3 Drawing Sheets

DISCOVERY OF APPLICATION SERVER IN AN IP NETWORK

CROSS-REFERENCED APPLICATION

This application relates to and claims priority from co-pending a U.S. provisional patent application Ser. No. 60/448,188, filed Feb. 18, 2003, entitled "DISCOVERY OF P-CSCF IN A VISITED WIRELESS IP NETWORK," the contents or which are incorporated by reference.

FIELD OF THE INVENTION

The present invention is generally directed to determining the Internet Protocol (IP) address of an application server and, more particularly, to determining the IP address of an application server providing services to IP devices being served by an IP network.

BACKGROUND

Mobile devices (MDs) are an increasingly ubiquitous component of telecommunications infrastructure. MDs can be mobile telephones, laptop computers with a radio link, or other portable devices. MDs, such as mobile telephones, use wireless media to communicate with their respective receivers, typically fixed in geographical position. One type of network protocol used by wireless receivers and by MDs is Internet Protocol (IP). In IP, data is segmented into data packets having known characteristics and formats. IP packets are routed to their intended destinations as a function of the information contained within these packets.

In wireless network, services, such as prepaid voice, instant messaging, broadcasting of information, and so forth, are provided to the MD through devices known as an application server (AS). An AS is a network element controlling applications, wherein the application is some part of a service that requires the use of IP bearer resources. In a wireless system that uses IP as a transport, a service is provided to an MD through the exchange of IP packets with a particular AS. Examples are servers that enable instant messaging, or a P-CSCF (Proxy Call Session Control Function) that provides routing for session initiation protocol (SIP)-based services. Each AS has its own unique IP address, which allows IP packets from a MD to be routed to the AS for the appropriate processing. However, there can be problems associated with this routing of IP packets to an AS.

One problem is if an MD desires a particular type of service the MD must discover the IP address of an AS that can perform functions related to that particular type of service. In general an AS performing a particular application function is associated with an IP network. Thus, if for example the MD is attempting to send an instant message, the AS performing this function in Operator's A network would not necessarily be the same AS performing this function in Operator's B network. Therefore, before attempting to send the instant message, the MD would have to determine the IP address of the AS performing that function in the network presently providing access to IP resources to the MD.

Although there are methods for an MD to obtain an IP address of the AS the methods do not take into consideration the routing restriction placed upon the request, such as either by the operator providing the access to IP resources, or the operator with whom the user has a subscription. Thus, in some scenarios, the MD being provided IP resources in Operator's A network might have the request for the IP address of an AS sent to Operator's B network (for Operator B is the operator for which the user has a subscription with). For these scenarios the response to the request would provide an IP address of an AS in Operator's B network instead of the desired response which would be an IP address of an AS in Operator's A network.

Therefore, there is a need for a mechanism to ensure that the MD requesting the IP address of an AS receives a response that contains an IP address of an AS associated with the network presently providing IP resources to the MD.

SUMMARY OF THE INVENTION

The present invention provides for determining an Internet Protocol (IP) address of a particular application server associated with a serving network. An IP address is received. A reverse domain name query is performed as a function of the received IP address. A response to the reverse domain name query is received. Serving network domain name information is derived from the reverse domain name query. An application server name is prefaced to the derived serving network domain name information. A domain name query is performed as a function of the derived serving network domain name prefaced with the application server name. An IP address is received as a function of the derived serving network domain name prefaced with the application server name.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION

In the following discussion, numerous specific details are set forth to provide a thorough understanding of the present invention. However, it will be understood by those skilled in the art that the present invention can be practiced by those skilled in the art following review of this description, without such specific details. In other instances, well-known elements have been illustrated in schematic or block diagram form in order not to obscure the present invention in unnecessary detail. Additionally, for the most part, details concerning IP systems and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein are performed by a processor such as a computer or electronic data processor in accordance with code such as computer program code, software, and/or integrated circuits that are coded to perform such functions.

Figure 1:
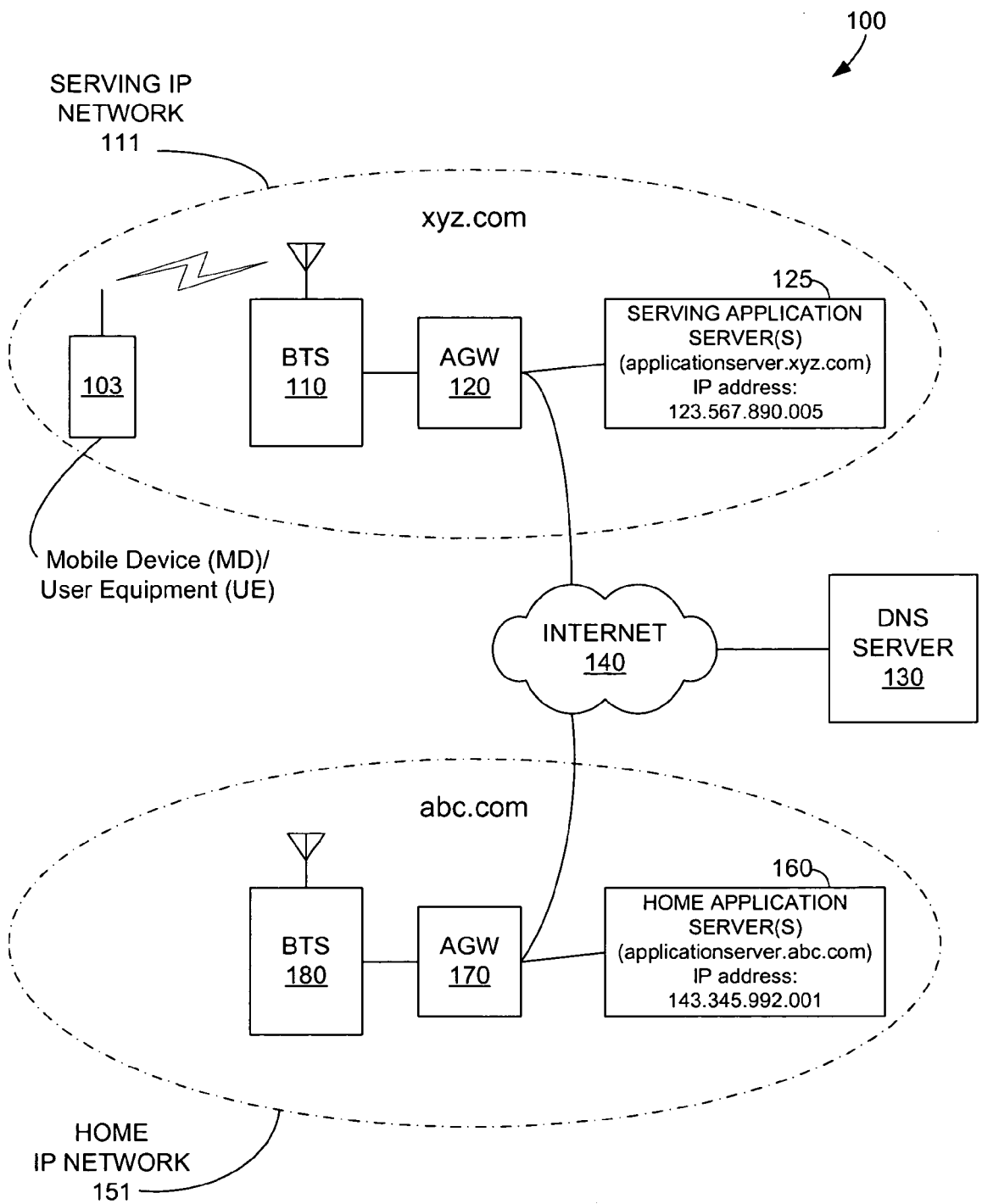
FIG. 1 illustrates a Home IP network coupled to a Serving IP Network though an Internet.

Turning now to FIG. 1, illustrated is a system 100 for conveying a Serving application server IP address to a visiting MD or user equipment (UE) 103, such as a personal digital assistant (PDA), a pager, and so on. Generally, in FIG. 1 a "global" IP address is assigned to a MD/UE 103 after the completion of a successful registration process. After the assignment of an IP address, the UE 103 desires to invoke a service which requires setting up a dialog with an application server associated with the serving IP network 111. However, in order to initiate a dialog, the MD/UE 103 discovers the IP address of the serving application server 125. The system 100 provides for discovery of the IP address of the serving application server 125 by the MD/UE 103, which for ease of illustration is shown as 123.567.890.005, of the serving IP network, for example, the Serving IP network name is "xyz".

In the system 100, a Home IP Network 151 is connected to an Internet 140 which is connected to Serving IP Network 111. The Home IP Network 151 communicates with the Serving IP Network 111 over the Internet 140. Coupled to the Internet 140 is a domain name server (DNS) 130. Each IP Network 111, 151 has its own network domain name. For ease of illustration, the Serving IP Network 111 is "xyz.com", and the Home IP Network is "abc.com", although those of skill in the art understand that other network domain names are possible.

The Home IP Network 151 has a first base transceiver station (BTS) 180 coupled to a first access gateway (AGW) 170. The first AGW 170 is also coupled to a home application server 160. Generally, the AGW 170 acts as a gatekeeper, allowing or denying access to Internet 140 for an MD/UE 103 operating in Home IP network 151. In FIG. 1, the home application server 160 has an IP address of 143.345.992.001, and an application server domain name of "applicationserver.abc.com." However, there can be a plurality of home application servers 160 within the home IP Network 151, each having its own unique IP address and application server domain name. Application server names are typically standardized usually based upon the function/functions the application server performs. The Application server domain name is a combination of the application server name, network name and the domain. For example, a p-cscf application server could be referred to as "p-cscf.xyz.com," where "p-cscf" is the application server name, "xyz" is the name of the network and "com" is the domain. For home IP Network 151 the network domain name is abc.com, where "abc" is the name of the network and the domain is "com", so the name of the home application server 160 would be "applicationserver.abc.com". This is one example of an application server domain name.

The Serving IP Network 111 has a second BTS 110 coupled to a second AGW 120. The second AGW 120 is also coupled to a serving application server 125. In FIG. 1, the serving application server 125 has an IP address of 123.567.890.005, and a application server domain name of "applicationserver.xyz.com". However, there can be a plurality of application servers within the Serving IP Network 111, each having its own unique IP address and application server domain name.

Furthermore, there is a visiting UE 103. The visiting UE 103 is in radio communication with the second BTS 110. The UE 103 has been assigned a global IP address and has received knowledge of the IP address associated with the second AGW 120. With the assignment of a global IP address AGW 120 granted permission to UE 103 to access the Serving IP Network 111 (xyz.com). Though access to the Serving IP Network 111 the UE 103 can also access the Internet 140 and other items connected to Internet 140 for example, Home IP Network 151. UE 103 decides to request a service which requires communication which a particular application server associated with the Serving IP Network 111. In order to establish a communication dialog UE 103 then discovers the IP address of the serving application server 125.

Using either the assigned IP address of UE 103 or the IP address associated with the second AGW 120, UE 103 performs a reverse DNS query by sending a request to DNS server 130. More specifically, the reverse DNS query is actually sent to the second AGW 120 which then forwards the request to DNS Server 130. This way UE 103 does not have to acquire knowledge on how to communicate with the DNS Server 130 supporting Serving IP Network 111. The DNS Server 130 will respond to the reverse DNS query by associating a device domain name with the IP address provided, for example, the device is either UE 103 or AGW 111. The device domain name includes the network domain name of the Serving IP network, for example xyz.com in FIG. 1, for the IP addresses of the devices, for instance, AGW 120 or UE 103 belonging to the Serving IP Network 111. UE 103 appends the network domain name of the Serving IP Network to a desired application server name to create an application server domain name, such as, for example, applicationserver.networkname.com. In the system 100, this would be applicationserver.xyz.com. UE 103 performs a DNS query to DNS server 130 using "applicationserver.xyz.com." as an input. DNS server 130 responds to the DNS query by associating an IP address with the application server domain name. This IP address of the serving application server 125, "applicationserver.xyz.com" is sent to the UE 103. For ease of illustration, in the system 100, the IP address of the serving application server is 123.567.890.005.

Figure 2:
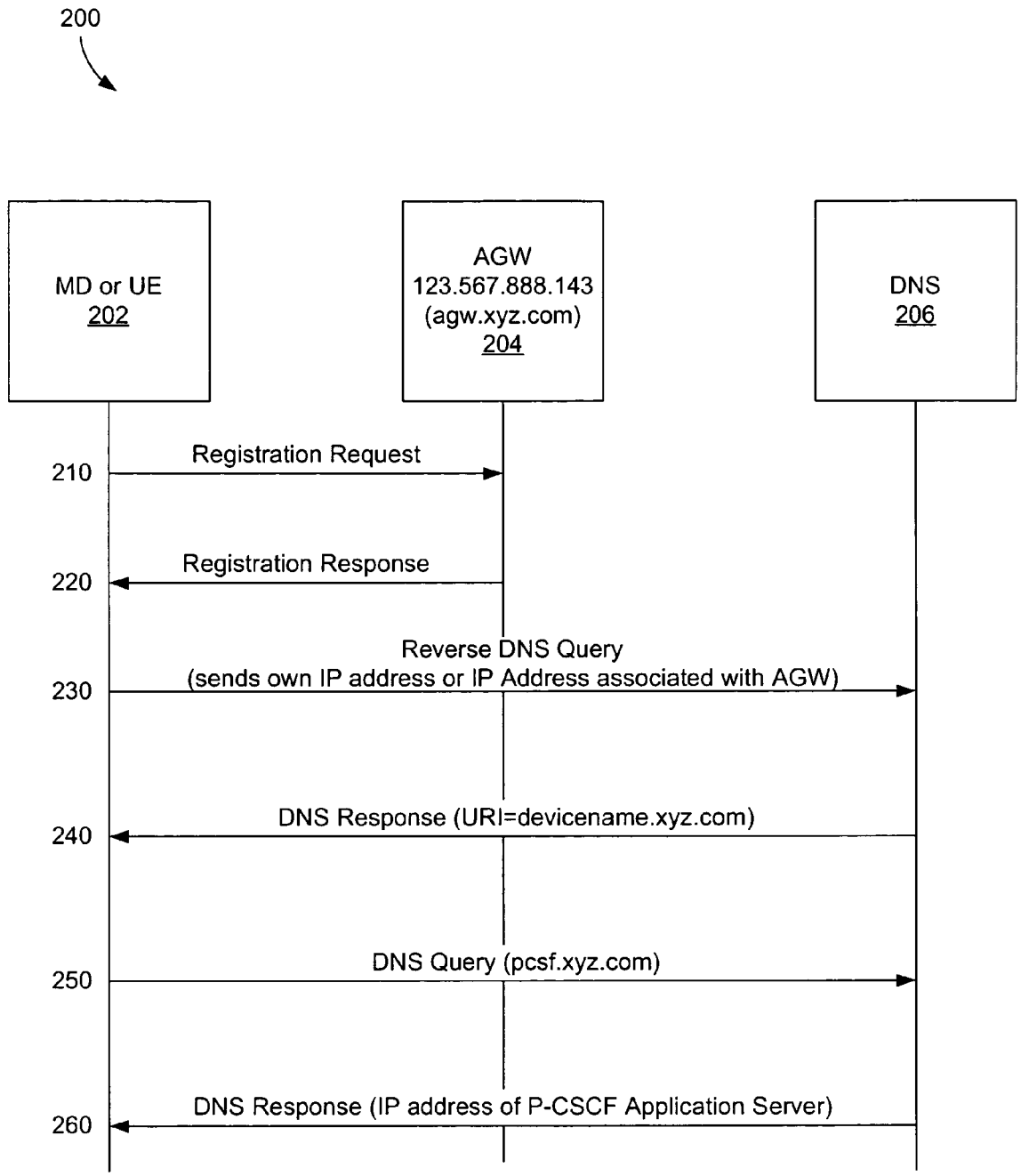
FIG. 2 illustrates a flow diagram associated with requesting an IP address of a serving application server.

Turning now to FIG. 2, illustrated is a flow diagram 200 of various signal flows of the system 100 for performing reverse DNS queries and DNS queries associated with discovering the IP address of an application server. In flow 210, the MD or UE 202, such as a PDA, a pager, and so on, is to register on a network, such as the Serving IP Network 111. Therefore, in flow 210, there is a request made from the UE 202 to the AGW 204 asking permission to access the IP network. In flow 220, the AGW 204, if it allows UE 202 to access the IP network with which the AGW 204 is associated, assigns UE 202 a global IP address and provides the IP address associated with AGW 204.

In any event, the IP address assigned to UE 202 or the IP address associated with AGW 204, has associated with it certain hierarchical, global information pertaining to the Serving IP network. Thus, using the IP address assigned to UE 202 or the IP address associated with AGW 204, the DNS 206, if the DNS 206 is provisioned with the information, can provide a requestor the network domain name of the Serving IP network.

If UE 202 determines that communications with an application server associated with the Serving IP network is desired then UE 202 first discovers the IP address of a serving application server. The discovery of the IP address of the Serving application server occurs as follows.

From the UE 202, the mobile sends a reverse DNS query to the DNS 206 in a flow 230. As is understood by those of skill in the art, a DNS server provides an association between an IP address and a device domain name. For instance, 123.567.888.143 could correspond to "agw.xyz.com," where the device is AGW 204.

The reverse DNS query of flow 230 conveys either the IP address of the UE 202, or an IP address associated with AGW 204. The DNS 206 determines the device domain name that corresponds to the received IP address. In Flow 240 the DNS 206 sends a DNS Query Response containing the device domain name to the UE 202. In FIG. 2, this is devicename.xyz.com. "Devicename" is a name corresponding with either the MD/UE or the AGW (depending on which IP address was sent in flow 230) and "xyz" is the network name, which corresponds to the Serving IP Network and ".com" corresponds to the highest level domain name.

A name for an application server is usually standardized and based upon the function of the application server. For instance, a P-CSCF application server has the AS name of "pcscf". Therefore, the UE 202 has stored in its memory or can otherwise determine the "applicationserver" name of the desired AS. However, in order to discover the IP address of the Serving application server, the UE 202 forms an application server domain name by combining the application server name and the network domain name of the Serving IP Network.

In flow 250, the UE 202 initiates a DNS query using the application server domain name. For instance, the MD/UE requests the IP address, using DNS query, for "pcscf.xyz.com."

In flow 260, the DNS server responses to the DNS Query with an IP address or IP addresses corresponding to "applicationservername.networkname.com", if the DNS 206 has knowledge of the associations. If the DNS 206 is unable to find this information, it informs UE 202 of this fact as well. From here, the UE 202 can attempt to communicate with the AS associated with the Serving IP network.

Figure 3:
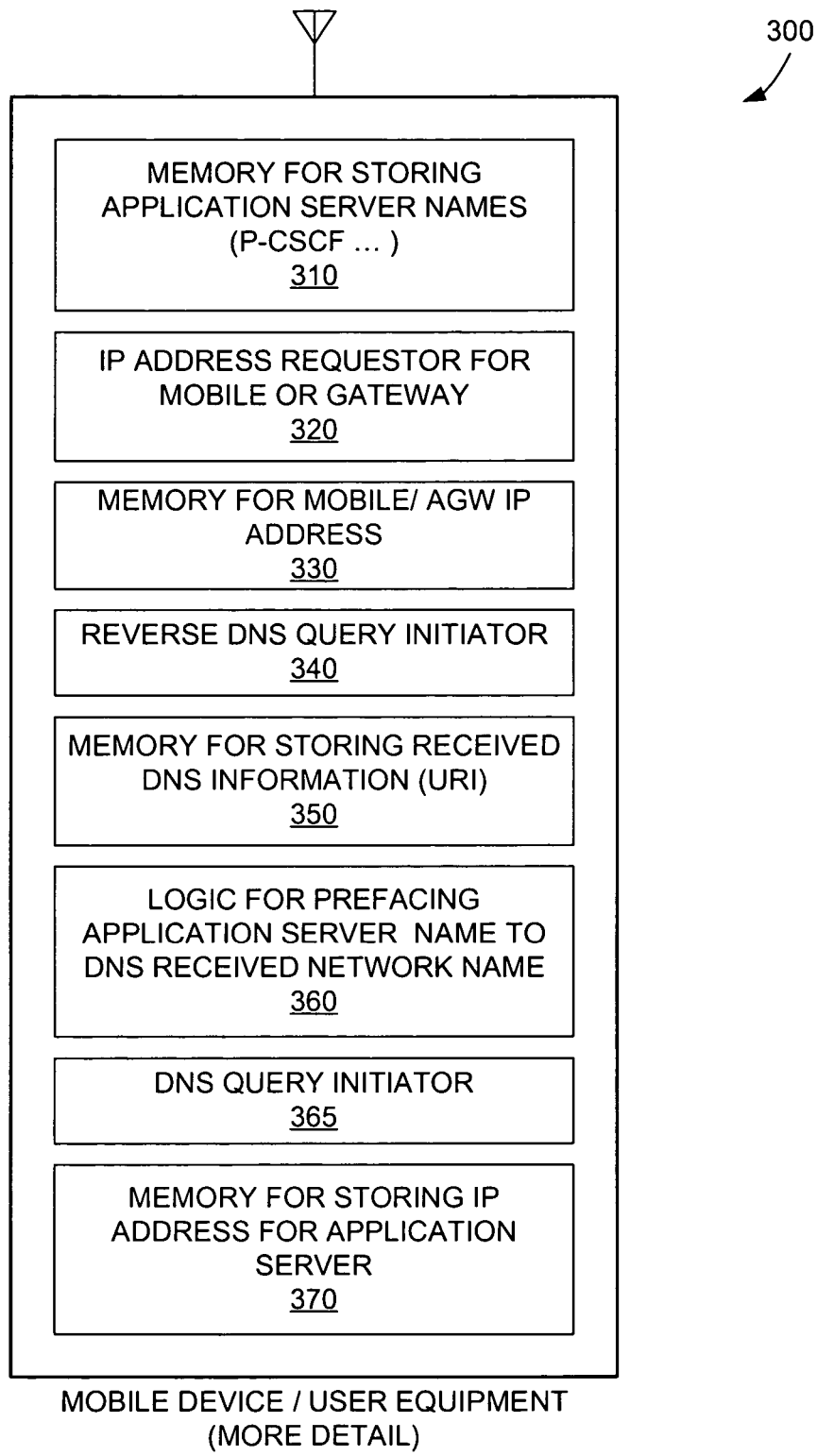
FIG. 3 illustrates an MD/UE configured to request an IP address for a serving application server.

Turning now to FIG. 3, illustrated is a UE 300 configured to initiate and receive the flows of the system 200. The UE 300 has memory units and processors to help enable the flow of FIG. 2. The UE 300 has a memory for storing application server names 310. The UE 300 has a requester 320 that initiates requests for access to the IP networks. The requestor 320 involves requesting an IP address for use by the MD/UE while using a given network.

There is memory 330 for storing the received IP address for the MD/UE, the IP address associated with the access gateway, or both, as appropriate. There is logic 340 to initiate a reverse DNS query after receiving the IP address in the memory 330 to be used in identifying the UE 300. There is memory 350 for storing the received DNS information, the URI, for the device associated with the IP address given in the reverse DNS query. There is also logic circuit 360 for parsing the network domain name information from the URI and appending it to the desired application server name to create the application server domain name. A DNS query initiator 365 then sends the application server domain name created by the logic 360, for example, applicationserver.networkname.com (for instance, "xyz.com"), to the DNS server. The DNS server then responds with any corresponding IP addresses it can find in its database, or any other databases it queries. These are then stored in the memory 370 for storing IP addresses for the application server.

It is understood that the present invention can take many forms and embodiments. Accordingly, several variations can be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention can be employed without a corresponding use of the other features. Many such variations and modifications can be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method of determining an Internet Protocol (IP) address of an application server in a visited serving network, comprising:
   receiving an IP address associated with a device on the network by a wireless mobile device;
   performing a reverse domain name query by the wireless mobile device using the received IP address;
   receiving, by the wireless mobile device, a response to the reverse domain name query comprising the visited serving network domain name, wherein the network is visited by the wireless mobile device and serving the wireless mobile device;
   extracting, by the wireless mobile device, the serving network domain name from the response to the reverse domain name query;
   selecting, by the wireless mobile device, an application server name as a function of a service desired by the wireless mobile device;
   appending, by the wireless mobile device, the extracted serving network domain name to the application server name, thereby generating a domain-specific application server name;
   performing, by the wireless mobile device, a domain name query using the domain-specific application server name; and
   receiving, by the wireless mobile device, a response to the domain name query comprising a second IP address, the second IP address identifying an application server in the visited serving network, the application server capable of providing the service desired by the wireless mobile device.

2. The method of claim 1, wherein receiving an IP address comprises receiving an IP address for the wireless mobile device.

3. The method of claim 1, wherein receiving an IP address comprises receiving an IP address associated with a device providing an IP address to the serving network.

4. The method of claim 3, wherein receiving an IP address associated with a device providing an IP address to the serving network comprises receiving an IP address of an access gateway.

5. The method of claim 1, wherein the step of deriving the serving network domain name information from the reverse domain name query further comprises deriving information from a Uniform Resource Identifier (URI).

6. The method of claim 1, wherein the application server name comprises a Proxy Call Session Control Function (P-CSCF) server name.

7. A system for determining an Internet Protocol (IP) address of an application server in a visited serving network, comprising:
   a wireless mobile device in communication with an access gateway of the serving network, wherein the wireless mobile device is configured to:
   request an IP address associated with a device on the network from the serving network;
   receive the requested IP address;
   perform a reverse domain name query using the received IP address;
   receive a response to the reverse domain name query comprising the visited serving network domain name, wherein the network is visited by the wireless mobile device and serving the wireless mobile device;
   extract the serving network domain name information from the response to the reverse domain name query;

select an application server name as a function of a service desired by the wireless mobile device;

append the extracted serving network domain name information to the application server name, thereby generating a domain-specific application server name;

perform a domain name query using the domain-specific application server name; and receive a response to the domain name query comprising a second IP address, the second IP address identifying an application server in the visiting serving network, the application server capable of providing the service desired by the wireless mobile device.

8. The system of claim 7, wherein the serving network has a URI.

9. The system of claim 7, wherein the IP address is the IP address of the wireless mobile device.

10. The system of claim 7, wherein the IP address is the IP address of a device providing an IP address to the serving network.

11. The system of claim 10, wherein the device providing an IP address to the serving network comprises the access gateway.

12. The system of claim 7, wherein the wireless mobile device is configured to store the second IP address.

* * * * *